(12) United States Patent
Gantt et al.

(10) Patent No.: US 9,361,168 B1
(45) Date of Patent: Jun. 7, 2016

(54) ACCESSING RESOURCES ACROSS A NETWORK BOUNDARY

(71) Applicant: Amazon Technologies, Inc., Reno, NV (US)

(72) Inventors: Ryan Preston Gantt, Seattle, WA (US); Brian James Schuster, Seattle, WA (US); Avinash Shripathy Bhat, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 14/224,966

(22) Filed: Mar. 25, 2014

(51) Int. Cl.
*G06F 11/00* (2006.01)

(52) U.S. Cl.
CPC .................................. *G06F 11/008* (2013.01)

(58) Field of Classification Search
USPC .......................................................... 714/19
See application file for complete search history.

(56) References Cited

U.S. PATENT DOCUMENTS

| | | | |
|---|---|---|---|
| 6,269,150 B1 * | 7/2001 | Herrbach et al. | H04M 3/323 370/244 |
| 8,433,811 B2 | 4/2013 | Guruswamy et al. | |
| 2006/0136896 A1 | 6/2006 | Bou-Ghannam et al. | |
| 2007/0294364 A1 | 12/2007 | Mohindra et al. | |
| 2013/0346787 A1 | 12/2013 | Rueegg et al. | |
| 2014/0019256 A1 | 1/2014 | Argue et al. | |
| 2014/0189641 A1 | 7/2014 | Anderson et al. | |
| 2015/0067677 A1 | 3/2015 | Naseh et al. | |
| 2015/0082281 A1 | 3/2015 | Koenig et al. | |
| 2015/0156118 A1 | 6/2015 | Madani et al. | |

* cited by examiner

*Primary Examiner* — Sarai Butler
(74) *Attorney, Agent, or Firm* — Davis Wright Tremaine LLP

(57) ABSTRACT

Remote computing resource service providers, including online retailers, provide externally facing computer systems that allow users to interact with the service provider. Furthermore, the service provider may maintain computer systems and services inside an isolated network not exposed to users. Occasionally, service providers may test these externally facing computer systems using one or more external hosts operating on a public network. As a result side effects may occur within the isolated network that is not accessible from the public network. The side effects may be recorded in a queue which may be accessed from inside the isolated network by one or more services. The one or more services may then reverse the side effects based at least in part on information contained in the queue.

20 Claims, 10 Drawing Sheets

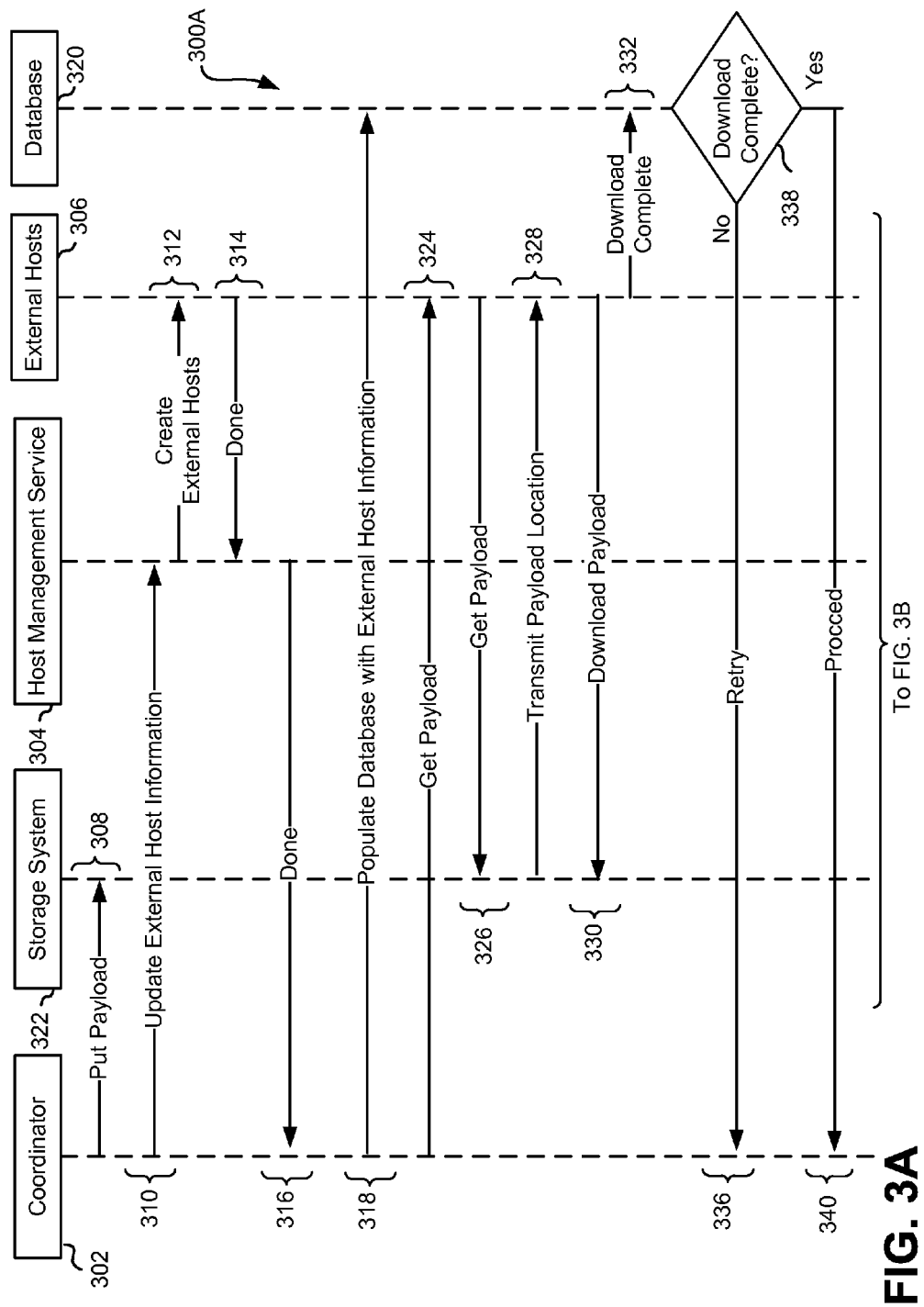

ACCESSING RESOURCES ACROSS A NETWORK BOUNDARY

CROSS-REFERENCE TO RELATED APPLICATIONS

This application incorporates by reference for all purposes the full disclosure of co-pending U.S. patent application Ser. No. 14/225,060, filed concurrently herewith, entitled "STATE-TRACKED TESTING ACROSS NETWORK BOUNDARIES".

BACKGROUND

The use of distributed computing systems and remote computing services, such as remote program execution and remote data storage, has greatly increased in recent years. Organization can provide scalable goods and service to users and/or customer of the organization. For example, an organization can provide a website, such as an electronic commerce website, to customers using distributed computing systems and remote computing services. Furthermore, organizations can employ virtual private networks (VPNs) to enable communication and improve security between the distributed computing systems and remote computing services. It may be beneficial for organization to occasionally conduct tests, such as load test, on all or a portion of the distributed computing systems and/or the remote computing services. However, it may be difficult to accurately test the distributed computing systems and remote computing service of the organization from inside the VPN boundary. To complicate matters, test ran from outside the VPN may be unable to access all of the distributed computing systems and/or the remote computing services due to those distributed computing systems and/or the remote computing services that are behind the VPN boundary.

BRIEF DESCRIPTION OF THE DRAWINGS

Various embodiments in accordance with the present disclosure will be described with reference to the drawings, in which:

FIG. 3A shows an example message diagram for a method for deploying a persistent, state-tracked testing environment across a VPN boundary in accordance with at least one embodiment;

DETAILED DESCRIPTION

Figure 1:
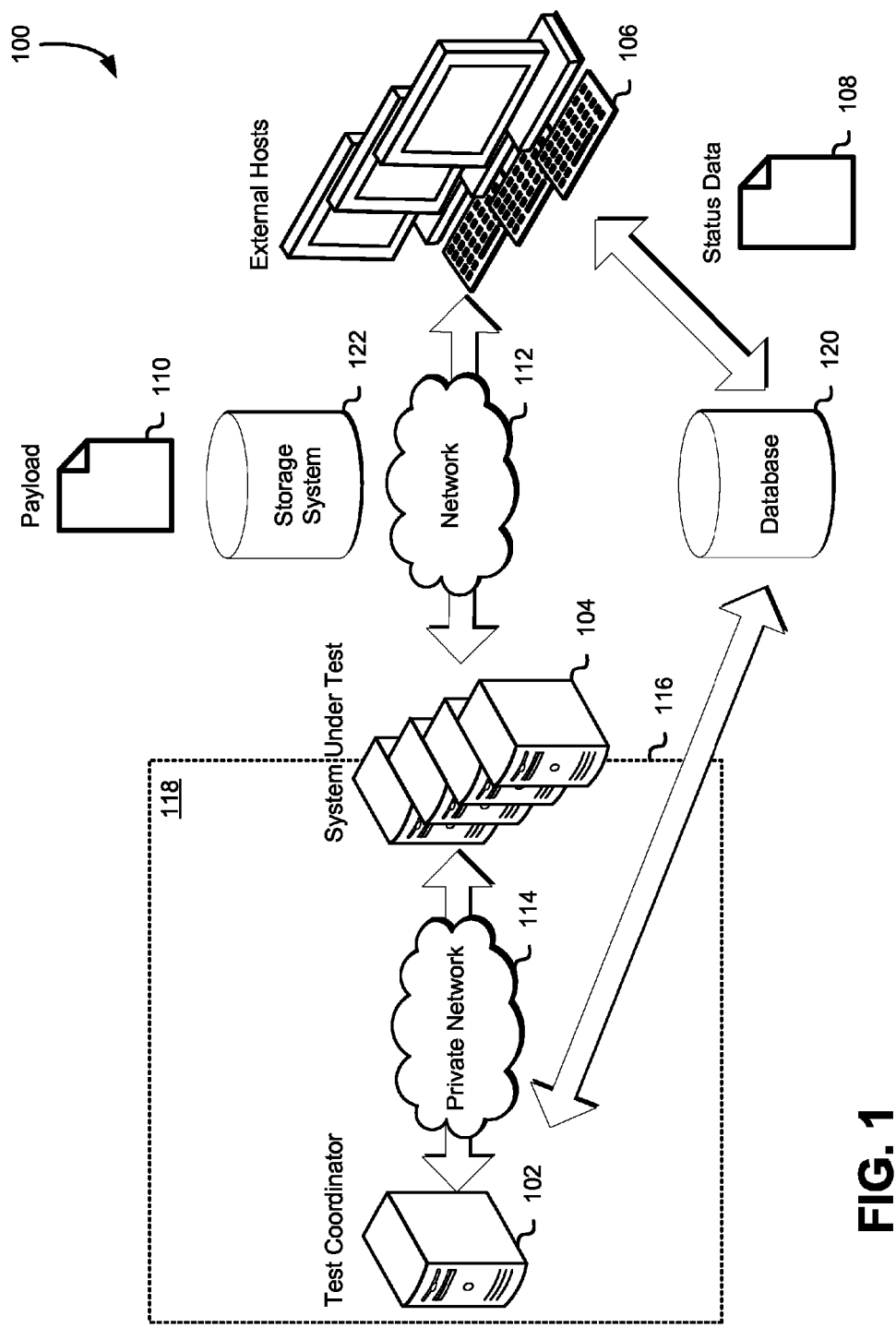
FIG. 1 shows an example of a persistent state-tracked test in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to persistent, state-tracked testing deployment across VPN boundaries and accessing resources across VPN boundaries to reverse various side effects of the testing. In some embodiments, the testing system uses a single host inside the VPN (referred to as a coordinator) to initiate a workflow that persists state information in a distributed data store and tracks the deployment, validation and extraction of a payload to one or more external host operations on a public network. The payload may include aggregated testing assets such as customer account number, product identification number, customer information, product information, request information, host information, port information, distributed computing systems information, remote computing services, application data, testing application, information or any other information corresponding to a system under test. The payload may be archived and stored in a storage system located on a public network in order to enable the one or more external hosts access to the archived payload.

The state of the one or more external hosts may be tracked using a database or other data storage system. The database may also be located on a public network in order to enable the one or more external hosts access to the database and allow the one or more external hosts to transmit state information to the database in order to be persisted. The testing system allows publicly-available services to be loaded or functionally tested using resources developed and stored within the VPN. The testing system may increase the quality of the test by more accurately simulating external client behavior through the use of the one or more hosts external to the VPN. Furthermore, by tracking the state of the one or more external hosts in the external database, the consistency of all external hosts is maintained and the workflow can be resumed from any source. The database may be initially configured by the coordinator such that the database is populated with host names of the one or more external hosts and other information suitable for maintaining state information for the one or more external hosts.

Deployment of the test may be managed by one or more coordinators executing on computer systems inside the VPN. The coordinator may generate the testing environment by first collecting the testing resources (also referred to as testing parameters) from various other distributed computing systems and/or remote computing services inside the VPN. The resources may be aggregated into an archive configured to enable the one or more external hosts to execute the test. The archive may be stored in a remote data store accessible to the one or more external hosts. Storing the archive may include the coordinator storing the archive in a remote data store or the coordinator causing the archive to be stored in the remote data store. The coordinator may then call a virtual computing resource service in order to generate the one or more external hosts. In various embodiments, the external hosts are already executing and the coordinator transmits testing instructions to the external hosts without first causing instantiation of the external hosts. The virtual computing resource service may instantiate the one or more external hosts, determine the one or more external hosts operational state and transmit an indication to the coordinator that the one or more external hosts are operational. The one or more external hosts may then transmit information corresponding to the current state of the one or more external hosts to the database and the database may record identification information for the one or more hosts and the transmitted state information.

For example, the virtual machine management service may receive a command to instantiate an external host, the virtual machine management service may then cause the external host to be instantiated and cause the external host to transmit a message indicating that the external host is operational once the external host has been instantiated. Causing the external host to transmit a message indicating that the external host is operational may include transmitting a request to the external hosts, the response to the request indicating that the external host is operational. The message may include identification information for the external host and information corresponding to the external host's current state. For example, the message may include a host name for the external host and a message indicating the external host is operational. In another example, the external host may receive a command to download the archived payload, the command may also include an Hypertext Transfer Protocol (HTTP) request to be executed by the external host upon completion of the download. The HTTP request may direct the external host to the database and enable the external host to indicate the external host's current state. Returning to the example above, if the external host has downloaded the archived payload successfully, the external may, using the HTTP request, indicate to the database that the archived payload has been successfully downloaded and the external host is ready to proceed with the deployment process.

The various states an external host, in an embodiment, include: on-line, prepared to receive payload, has received payload; prepared to validate payload; has validated payload; prepared to extract payload; extracted payload; prepared to validate extracted payload; has validated extracted payload; and is prepared to execute test. At one or more of the steps in the deployment process, the one or more external hosts may receive commands over a Secure Shell (SSH) connection from the coordinator indicating what step of the deployment process to execute. The coordinator may then query the database to determine which external hosts of the one or more hosts have successfully executed the command based at least in part on the current status information contained in the database. For example, the coordinator may transmit a command to the one or more external hosts, the command may indicate to the one or more external hosts to validate the received payload. The one or more external hosts may the validate the payload using a checksum and transmit an indication to the database whether the payload validated successfully based at least in part on the checksum.

The coordinator may wait an amount of time and transmit a query to the database in order to determine the current state of the one or more external hosts. In various embodiments, the coordinator may subscribe to a stream operated by the database indicating received state information from the one or more external hosts. If the coordinator determines that any of the external hosts have failed a particular step in the deployments process, the coordinator can cause the particular failed external host to roll back and retry the failed step. Furthermore, the coordinator may perform various other mitigation techniques for external hosts that have failed a particular step in the deployment process including retrying the failed step on all the external hosts, retrying the entire deployment process, terminating the failed external hosts, replacing the failed external hosts with one or more replacement external hosts, failing the entire deployment process or any other technique suitable for mitigating the failed external hosts.

Once the one or more externals hosts have completed the deployment process, the coordinator may transmit a command to the one or more external hosts to perform various tests. The one or more external hosts may all obtain identical payloads from the storage system but may execute different tests on the system under test. The one or more external hosts may receive different test commands from the coordinator, for example, a subset of the one or more external hosts may receive a command to execute a load test on the system under test and a second subset of the one or more external hosts may receive a command to execute a purchase test on the system under test. The one or more external hosts may execute multiple tests at once or in sequence based on a single command or multiple commands from the coordinator.

Furthermore, the one or more external hosts may transmit information corresponding to the test to the database. For example, the one or more external hosts may transmit the result of the test to the database and any change in state that results from the execution of the test. The change in state may include information such as the purchase history of a customer, browse history of a customer, customer library, customer credit information, customer recommendations, third party credit information, advertisement information, customer entitlements, customer status information, increase in the quantity of items sold, reduction in inventory, information preventing the customer from purchasing the item again, item popularity, services the customer subscribes to, charges to a third party, charges to advertiser, experience points granted to the customer, changes to the customer's location, a discount or discount code added to the customer account, reduction in the amount of customer gift card or electronic wallet, notifications sent to ship an item or any other information corresponding to the state associated with customer account information. For example, a purchase test executed by one or more of the external hosts on the public network may result in the purchase of an item being associated with one or more customer accounts causing a change in the state of the one or more customer accounts. By tracking the state of the customer accounts and the system under test, the state information may be reverted to a pre-test state so that further tests may be run and the system under test is not altered or otherwise affected by the tests executed by the coordinator and the one or more external hosts.

Contemporaneously or near contemporaneously with the execution of a particular test, the one or more external hosts may enqueue a message with a queue operated by a queue service. The message may contain sufficient information to revert the state information to a previous state. The queue service may be listening to the queue in order to detect a message being enqueued into the queue. The queue service may then obtain the message from the queue and cause a restore service to restore a previous state. For example, a particular external host may, during the execution of a purchase test, purchase an item which may cause a fulfillment service connected to the system under test to add the item to a customer account associated with the particular external host. During the purchase test, the particular external host may enqueue a message with the queue indicating the item purchased and the customer account associated with the particular external host. The queue service, listening to the queue, may obtain the message and call the restore service with the information indicating the item purchased and the customer account associated with the particular external host. The restore service may then access one or more systems inside the VPN boundary, such as the fulfillment service, and restore the state of the customer account to a previous state where the customer account does not include the purchase item.

FIG. 1 illustrates an example environment 100 where one or more computer systems running within a service provider environment, as well as the associated code running thereon, may execute a deployment of testing resources outside of the service provider environment in order to test the one or more computer systems of the service provider. A service provider 118 may include website operators, online retailers, social network providers, cable providers, online game providers or any entity capable of receiving automated agent traffic. A test coordinator 102 (also referred to simply as a coordinator) may be located within a VPN boundary 116 of a service provider 118. The VPN boundary 116 may isolate computer systems connected to a private network from computer systems connected to a public network. For example, traffic from computer systems outside the VPN boundary 116 may be regulated such that some or all of the traffic may be restricted, allowed, partially allowed or any combination thereof. The VPN boundary 116 may be implemented as network interface, computer system, computer subsystem, process, application or other such computer system entity. The coordinator 102 may be a collection of computing resources collectively configured to execute various tests on computer system of the service provider 118. For example, the coordinator may be an internal host executed by the service provider and operated by an administrator or other entity of the service provider. The coordinator 102 may be connected to one or more systems or services of the service provider 118 over a private network 114 such as the system under test 104. Furthermore, one or more external hosts 106 may connect to the online retailer 180 through the system under test 104 and may initiate connection with and/or interaction with one or more applications running on the system under test 104 of the online retailer 118 in order to execute various tests. The system under test 104 may be a collection of computing resources collectively configure to provider an externally facing interface for customers and/or users allowing entities to interact with the service provider 118. For example, the system under test 104 may be one or more webservers operated by the service provider 118 in order to provide an interactive website for customers of the service provider 118. The system under test 104 may also be operating to provide services for the real accounts while the test is occurring. For example, the one or more external hosts 106 may be generating load on the system under test 104 contemporaneously with one or more customers accessing resources of the system under test 104 in order to receive a service.

The service provider 118 through the system under test 104 may provide an electronic marketplace offering goods and services for purchase and/or consumption by customers of the service provider 118. The command or commands to connect to the online retailer in order to execute the various tests may originate from an outside computer system and/or server, or may originate from an entity, user or process on a remote network location, or may originate from an entity, user or process within the service provider such as the test coordinator 102, or may originate the one or more external hosts 106, or may originate as a result of an automatic process or may originate as a result of a combination of these and/or other such origin entities. Information corresponding to the various tests may be included in an archived payload 110. The payload 110 may be generated by the coordinator 102 and may include information suitable for executing the various tests by the one or more external hosts 106. In various embodiments, the payload 110 may include one or more executable applications that, when executed by the one or more external hosts 106, can cause the one or more external hosts to perform the various tests. Various different archiving techniques may be used to collect testing assets and generate the payload 110 including concatenating testing assets, compressing testing assets, generating a software package containing the testing assets, generating a disk image containing the testing assets, encrypting the testing assets or any combination thereof. For example, archiving the testing assets to generate the payload may include concatenating customer account information with a test application and compressing the result of the concatenation into a single archive file.

In order to generate the payload, the coordinator 102 may aggregate data located within the VPN boundary 116, the data may include customer account information, product information and information corresponding to the system under test 104. For example, the data may include a number of test customer accounts containing all the required account information but the customer account may not correspond to an actual customer of the service provider 118. Furthermore, the data may include all or a portion of the information corresponding to the goods and/or services offered by the service provider 118. For example, the data may include product identification numbers for all of the items offered for consumption on an electronic commerce website operated by the service provider 118. In another example, the data may include a list of services offered by the service provider. Finally, the data may also include information corresponding to the system under test 104 so as to enable the one or more external hosts to connect and communicate with the system under test. For example, the data may include login information for the customer accounts, port information for the system under test 104, request format for the system under test 104 or any other information suitable for execution of the test by the one or more external hosts 106.

Once the payload data has been aggregated, the coordinator 102 may transmit the payload to a storage system 122 located on the public network 112 or otherwise configured to be accessible outside the VPN boundary 116. The public network 112 may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others. In various embodiments, the coordinator 102 transmits the payload 110 directly to the one or more external hosts 106. The coordinator 102 may communicate with the one or more external hosts 106 over a SSH connection or other secured connection.

Once the payload 110 has been stored in the system 122, the coordinator 102 may transmit a command to the one or more external hosts to obtain the payload 110 from the storage system 122. The command may include information capable of identifying the payload 110 and the storage system 122. For example, the command may include a uniform resource locator (URL) for the storage system 122 and the payload 110. Once received, the payload 110 has been received by the one or more external hosts 106, the one or more external hosts 106 may extract the payload 110 and prepare to execute the various tests. The storage system 122 may be a collection of computing resources configured to synchronously process requests to store and/or access data. The storage system 122 may operate using computing resources that enable the storage system 122 to locate and retrieve data quickly, so as to allow data to be provided in responses to requests for the data. For example, the storage system 122 may maintain stored data in a manner such that, when a request for a data object is retrieved, the data object can be provided (or streaming of the data object can be initiated) in a response to the request. As noted, data stored in the storage system 122 may be organized into data objects. The data objects may have arbitrary sizes except, perhaps, for certain constraints on size. Thus, the storage system 122 may store numerous data objects of varying sizes. The storage system 122 may operate as a key value store that associates data objects with identifiers of the data objects which may be used by the one or more external hosts 106 to retrieve or perform other operations in connection with the data objects, such as the payload 110, stored by storage system 122.

The one or more external hosts 106 may include one or more virtual machines operated on a public network 112 by the service provider 118 or a service of the service provider 118, such as a virtual machine service. For example, the coordinator may submit a request to the virtual machine service in order to instantiate the one or more external hosts 106 used to execute the various tests. In various embodiments, the one or more external hosts 106 are computer systems operated by the customers of the service provider 118. For example, the service provider 118 may offer a discount or coupon for customers in exchanging for allowing the coordinator 102 to use the customers' computer systems as an external host 106 for executing the various tests. Once the one or more external hosts 106 have been instantiated the virtual machine service, the virtual machine service may transmit the host names to the coordinator 102 and the coordinator 102 may populate the database 120 with the host names in order to configure the database to receive status data 108 from the one or more external hosts 106. Furthermore, the one or more external hosts 106 may be pre-instantiate computer systems, customer computer system where the customer has agreed in a terms of service agreement to allow the service provider to utilize the customer's computer system for testing purposes, mobile devices, tablets, gaming systems or any other device capable of generating load on an externally facing computer system.

The virtual machine service may be a collection of computing resources configured to instantiate virtual machine instances on behalf of the coordinator 102. The coordinator 102 may interact with the virtual machine service (via appropriately configured and authenticated API calls) to provision and operate virtual computer systems that are instantiated on physical computing devices hosted and operated by the service provider 118 and located on a public network 112. The virtual machines (also referred to a virtual computer systems) may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual machine service is used by the coordinator 102 in FIG. 1, any other computer system or computer system service may be utilized by the coordinator 102, such as the coordinator that does not employ virtualization or instantiation and instead provisions computing resources on dedicated or shared computers/servers and/or other physical devices.

The one or more external hosts 106 may periodically or aperiodically transmit status data 108 (also referred to as state information) to the database 120. For example, at each step of the deployment process the one or more external hosts 106 may transmit status data 110 to the database 120. The database 120 may be a collection of computing resources that collectively operate to run one or more databases for the coordinator. For example, the database 120 may maintain information corresponding to the one or more external hosts 106 for the coordinator 102 such that the coordinator 120 may query the database 120 in order to obtain information corresponding to the one or more external hosts 106. The coordinator 102 may operate and manage the database 120 from the database service by utilizing appropriately configured API calls. Furthermore, the one or more external hosts 106 may transmit information, such as the status data 108, to the database over the public network 112.

The status data 108 may include corresponding to the particular external host's 106 state during the deployment process. For example, a particular external host 106 may receive a command to retrieve the payload 110 from the storage system 122, based at least in part on the command, the particular external host may begin downloading the payload 110 from the storage system 122. Upon completion of the download, the particular external hosts 106 may transmit status data 108 to the database 120, the status data indicating the particular external host 106 has complete the download successfully. In the alternative, if the particular external host 106 has failed to download the payload 110 successfully, the status data may indicate that the download has failed and may also include error information corresponding to any errors that may have occurred during the download to cause the download to fail.

The coordinator 102 may query the database 120 in order to receive state information corresponding to the one or more external hosts 106. In various embodiments, the database 120 transmits notifications to the coordinator 102 indicating that status data 108 have been received from the one or more external hosts 106. The coordinator 102 may transmit commands to the one or more external hosts 106 during the deployment and testing process and may, at some point after transmitting the command, query the database 120 in order to determine the execution of the commands by the one or more external hosts 106. For example, the coordinator may transmit a command to the one or more external hosts 106 requiring the one or more external hosts to validate the payload 110 downloaded from the storage system 122. The command may include a candidate checksum configured to allow the one or more external hosts 106 to validate the payload 110. The one or more external hosts 106 may then validate the payload 110 and transmit information corresponding to validation of the payload 110 to the database 120. The coordinator may then query the database 120 in order to determine the one or more external hosts 106 that have executed the command to validate the payload 110.

Based at least in part on the query results, the coordinator 102 may perform a variety of different actions. For example, if all or a sufficient percentage of the one or more external hosts 106 successfully validated the payload 110, the coordinator 102 may proceed with the next step of the deployment process. Furthermore, if any of the one or more external hosts 106 failed to validate the payload, the coordinator 102 may cause the particular external host 106 that failed to validate the payload to roll back to a previous state and attempt the command again. For example, the coordinator 102 may cause the particular external host 106 to re-obtain the payload 110 again from the storage system 122 and revalidate the payload based at least in part on the candidate checksum. Other actions may be performed by the coordinator 102 such as terminating external hosts 106 that have transmitted an indication to the database 120 that a particular command has failed.

Figure 2:
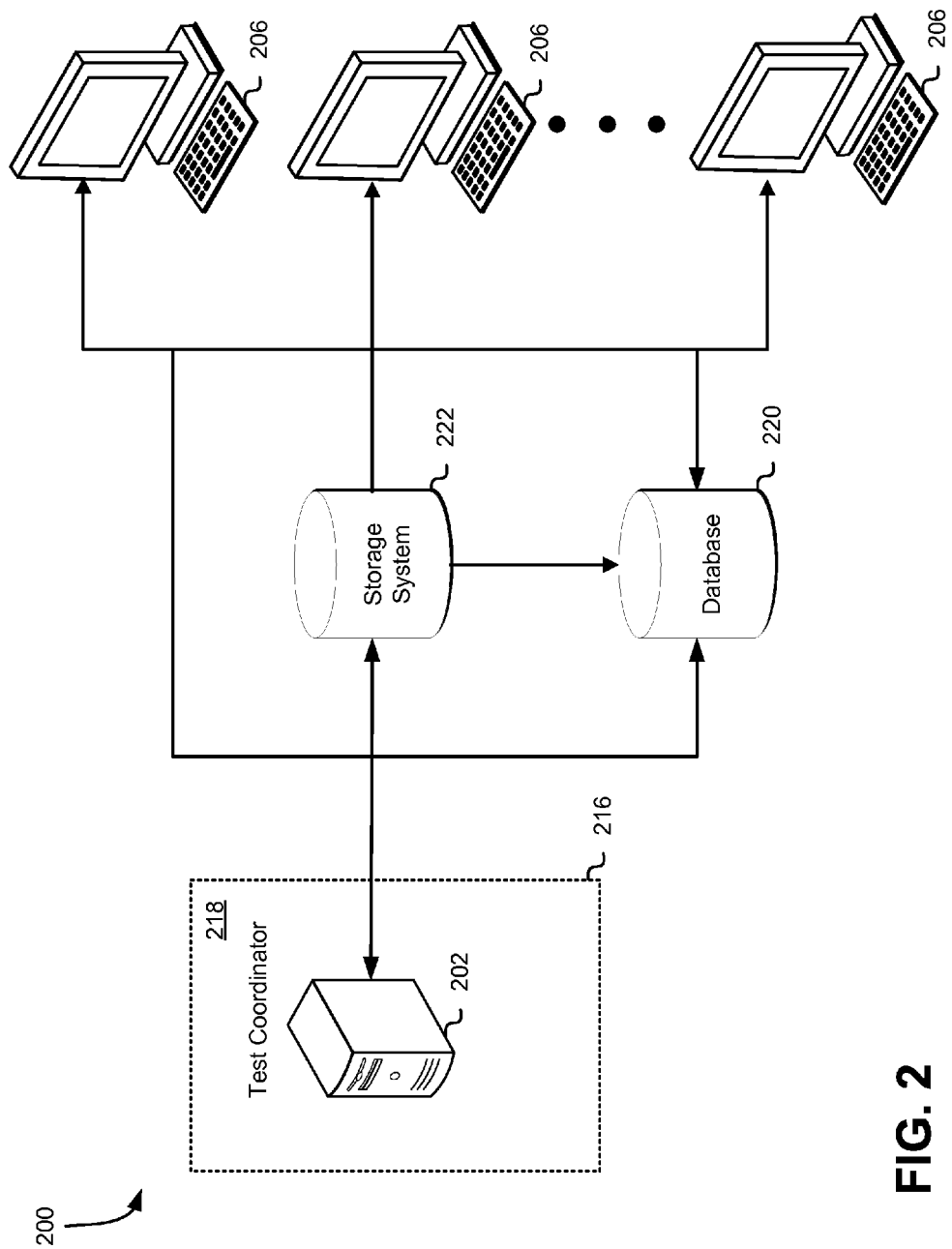
FIG. 2 show an example set up a persistent state-tracked test in accordance with at least one embodiment.

FIG. 2 illustrates an example environment 200 where one or more computer systems running within a service provider environment, as well as the associated code running thereon, may execute a deployment of testing resources outside of the service provider environment in order to test the one or more computer systems of the service provider. A service provider 218 may execute a coordinator 202, the coordinator 202 may manage the deployment and execution of various testing resources across a VPN boundary 216. The testing resources may include non-public information maintained by the service provider 218, such as dummy customer accounts used for testing various systems of the service provider. The testing resources may further include a variety of other information such as the test data described above in connection with FIG. 1. For example, the testing resources may include goods or services the service provider 218 is attempting to test, such as mobile applications offered for consumption on an application store or other electronic commerce site.

The coordinator 202 may collect testing resources, archive the testing resources and save the archived testing resources in the storage system 222. The coordinator may collect the testing resources for a variety of sources, including an account service to be discussed in greater detail below in connection with FIG. 5. In various embodiments, the coordinator 202 is configured with the testing resources and is responsible for managing the testing resources. The coordinator 202 may transmit the archived testing resources to the storage system 222 through an API call containing the archived testing resources. Alternatively, the coordinator 202 may also establish a secure connection with the storage system 222 in order to transmit the archived testing resources over the secure connection. The coordinator 202 may also be configured to communicate with the one or more external hosts 206 over a secure connection.

The one or more external hosts 206 may receive commands from the test coordinator 202 and may transmit state information to the database 220. In various embodiments, the one or more external hosts 206 receive a command from the test coordinator 202 through a virtual machine service as described above in connection with FIG. 1. For example, the coordinator may submit service calls to the virtual machine service and the virtual machine service may cause the one or more external hosts 206 to execute the service calls submitted by the test coordinator 202. The one or more external hosts 206 may transmit state information and other information corresponding to commands received from the coordinator 202 to the database 220. The one or more external hosts 206 may transmit the state information and other information over a network connection between the one or more external hosts and the database 220. For example, the commands received by the one or more external hosts 206 from the coordinator 202 may include an HTTP request configured to allow the one or more external hosts 206 to transmit the state information and other information to the database 220 over a network connection.

The storage system 222 and database 220 may include several separate data tables, databases, data documents, dynamic data storage schemes and/or other data storage mechanisms and media for storing data relating to a particular aspect of the present disclosure, such as the archived testing resources and the state information and other information corresponding to the one or more external hosts 206. The coordinator 202 may obtain information from the database 220 in order to determine the state and other information corresponding to the one or more external hosts 206. The coordinator 202 may submit queries to the database 220 using a variety of different techniques, for example, the coordinator may submit a service call or API call to the database including a query corresponding to the state and other information requested by the coordinator. The coordinator 202 may also submit queries over a network connection with the database 220. In various embodiments, the coordinator 202 submits queries and other requests, such as write requests and database initialization requests, to a database management service responsible for managing the database 220.

Figure 3B:
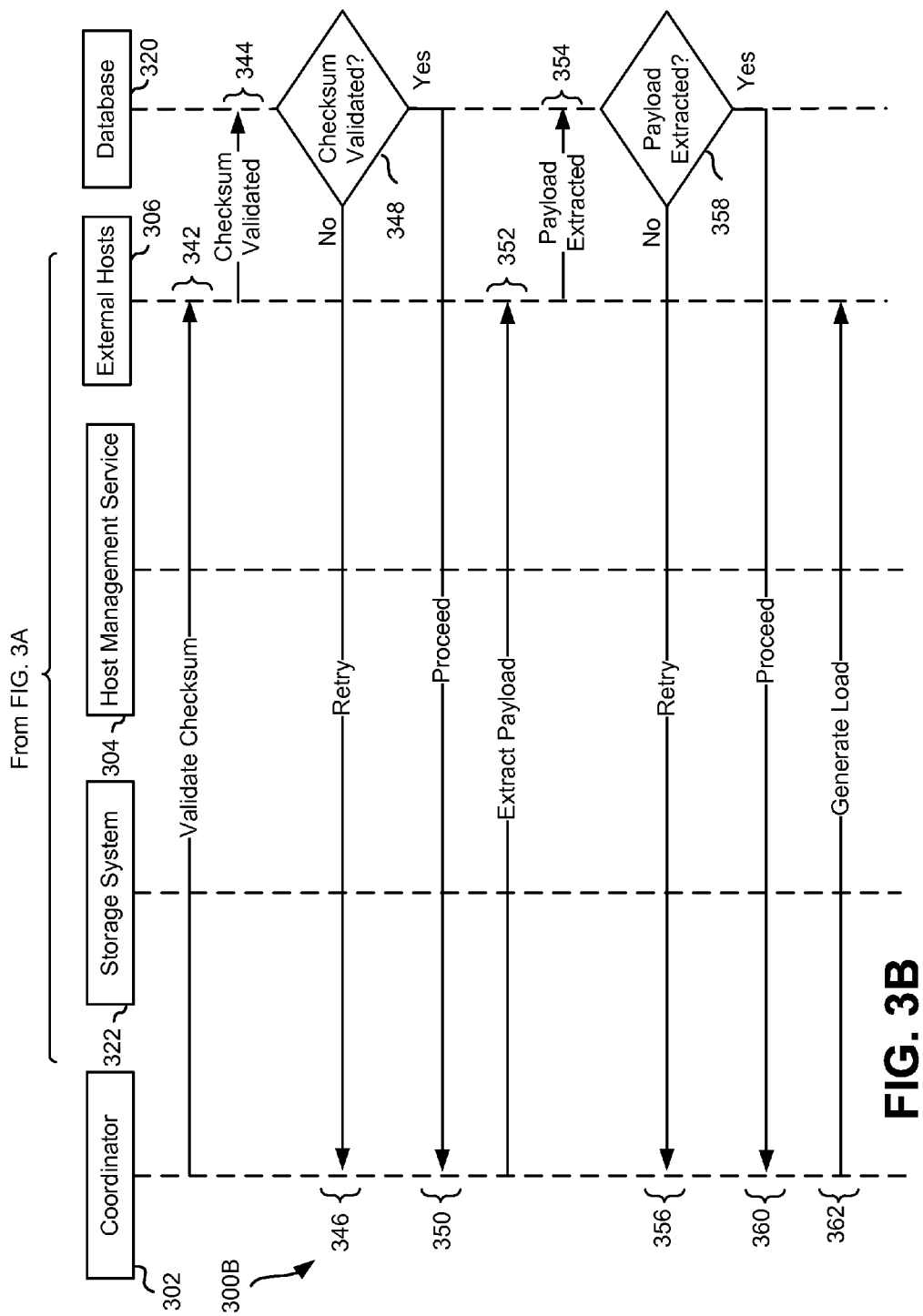
FIG. 3B shows an example message diagram for a method for deploying a persistent, state-tracked testing environment across a VPN boundary in accordance with at least one embodiment.

FIGS. 3A-3B shows an example of a messaging diagram for deploying testing resources across a VPN boundary using persistent state tracking 300A. In FIGS. 3A-3B, a number of different components executing the deployment are shown including a coordinator 302, a storage system 322, a host management service 304, external hosts 306 and a database 320. The coordinator 302 may be an internal host system as described above in connection with FIG. 1. The storage system 322 may include a storage system capable of storing payload data as described above in connection with FIG. 1 The host management service 304 may be responsible for coordinating the execution and operation of the external host 306. For example, the host management service 304 may be a virtual machine service as described above in connection with FIG. 1. The external host may be one or more computer systems outside of the VPB boundary and connected to a public network, such as the one or more external hosts described above in connection with FIG. 1. The database 320 may be a data store configured to store information received from the one or more external hosts, such as the database described above in connection with FIG. 2.

As shown in FIGS. 3A-3B, the coordinator 302 may deploy testing resources to external hosts in order to execute one or more tests on computer systems operated by the service provider. The coordinator 302 may first archive the testing resources to enable the testing resources to be stored in storage system 322 and to be extracted and executed by the external hosts 306. The coordinator 302 may execute a put command or service call to put the payload 308 on the storage system 322. In one example, the coordinator 302 makes an API call including the payload to the storage system 322, the API indicating to the storage system 322 to save the payload. The storage system 322 may respond to the API call by causing the payload to be stored and returning a location of the stored payload. In various embodiments, the API call from the coordinator includes a location for the storage system 322 to store the payload. The coordinator may then transmit an update corresponding to the external host information 310 to the host management service 304. The external host information may include host names, host types, host operating systems, the total number of hosts or any other information suitable for instantiating the external hosts 306.

The host management service 304 may then create the external hosts 312 based at least in part on the external host information. The host management service 304 may transmit a command to one or more hypervisors executed by the computer system of the service provider to instantiate a particular number of external hosts 306. In various embodiments, the host management service may monitor the instantiation of the external hosts 306 in order to mitigate for any failures of the external hosts to successfully instantiate. For example, the host management 304 service may monitor execution of the external host 306 and scale the computing capacity of the external host upward or downward based at least in part on the execution of the external hosts. The external host 306 may transmit an indication that the instantiation process is done 314 to the host management service 304. If less than all the external hosts 306 transmit the indication to the host management service 304, the host management service may then attempt to instantiate additional external hosts 304 in order to satisfy the request by the coordinator 302. In various embodiments, the host management service does not attempt to instantiate additional external hosts 306 to replace any external hosts 306 that may have failed to successfully instantiate.

Once the external hosts 306 have been instantiated and the host management service 304 received the indication that the external hosts 306 are operations, the host management service 304 may transmit an indication to the coordinator 302 that instantiation of the external hosts 306 is done 316. The indication may include the number of external hosts 306 that have successfully instantiated and the host names associated with each successfully instantiated external host 306. If less than the requested number of external hosts 306 were instantiated, the coordinator 302 may terminate the deployment process, request additional external hosts 306 or continue the deployment process with less than the requested number of external hosts 306. The coordinator 302 may then populate the database 320 with external host information 318. The external host information 318 may include identification information such as host names for each of the external hosts 306. The database 320 or a database management service may then populate the database 320 based at least in part on the external hosts information and configure the database 320 to receive status and/or state information from the external hosts 306.

The coordinator 302 may then transmit a command to the external hosts 306 indicating to the external hosts 306 to get the payload data 324 from the storage system 322. The command may include the location of the storage system 322 and/or the location of the payload. Furthermore, the command may include an HTTP request to be executed by the external hosts 306 upon completion of the command, the HTTP request may cause the external hosts 306 to update the database 320 with state information. The external hosts 306 may then request the payload from the storage system 322 by transmitting a get payload 326 request to the storage system 322. The storage system 322 may respond to the request by transmitting the payload location 328 to the external host 306. The payload location may be a URL or other reference information configured to refer to the location of the payload. Based at least in part on the location information associated with the payload, the external hosts 306 may request download of the payload 330 from the storage system 322. For example, the external hosts may submit the URL along with a download request to the storage system 322.

Once the download is complete, the external hosts 306 may transmit the HTTP request included in the command from the coordinator 302 and update the database 320 with the state information corresponding to whether the download completed 332. At some point later, the coordinator 302 may query the database 320 to determine which external hosts 306 have successfully downloaded the payload. In various embodiments, the database 320 streams updates to the database 320 from the external hosts 306 to the coordinator 302. The query from the coordinator 302 to the database 320 may retrieve information corresponding to each external hosts 306 and indicate whether the download completed 338. If the retrieved information indicates that any of the external hosts 306 have failed, the coordinator 302 may retry 336 the download step on the external hosts 306 that failed to download the payload successfully.

Various other techniques may be used in accordance with the present disclosure to account for external hosts that have failed one or more steps of the deployment process. For example, if the database 320 indicates that a subset of the external hosts 306 have failed to download the payload successfully, the coordinator 302 may retransmit the download command to the subset of external hosts 306. The coordinator 302 may also cause any external hosts 306 that have failed a particular step of the deployment process to roll-back to a previous successful state, fail the entire deployment process, restart the entire deployment process, cause a number of replacement external hosts 306 to be instantiated in order to replace the failed external hosts 306 or proceed with the deployment process with attempting to retry or otherwise repair the failed external hosts 306. Furthermore, if the coordinator 302 determines to proceed with the deployment without attempting to remediate any failed external hosts 306, the coordinator 302 may still transmit the command to the failed external hosts 306. For example, if a particular external host 306 fails to validate the extracted payload, the coordinator 302 may still transmit the command to the particular external hosts to perform various tests.

Returning to FIG. 3A, the coordinator 302 may determine, based at least in part on the information retrieved from the database 320, to proceed 340 with the deployment process. The deployment process is further illustrated in FIG. 3B. The coordinator 302 may transmit a command to the external hosts 306 to validate a checksum 342, the checksum corresponding to the payload obtained from the storage system 322. The command may include a candidate checksum and an HTTP request to be executed after the external hosts 306 validate the candidate checksum, the HTTP request may be configured to update the database 320 with the result of the validation. In various embodiments, the external hosts 306 generate a checksum based at least in part on the payload and transmit the checksum to the coordinator for validation. Returning to FIG. 3B, the coordinator 203 may query the database 320 to determine if the external hosts 306 have validated the checksum 348. If the one or more of the external hosts 306 have failed to valid the checksum, the failed external hosts 306 may retry 346 to validate the checksum or may retry 346 the download operation and re-validate the checksum after the payload has been downloaded from the storage system 322 again.

If all of the external hosts 306 have validated the checksum and/or if the coordinator has determined to proceed 350 with the deployment process, the coordinator 302 may then transmit a command to the external hosts 306 to extract the payload 352. The command may further include an HTTP request configured to be executed by the external hosts 306 and update the database 320. In various embodiments, the external hosts 306 are configured to transmit state information to the database 320 without a contemporaneous command from the coordinator 302. For example, the external hosts 306 may be configured to update the database 320 with state information once the state of the external hosts 306 changes. The external hosts 306 may then attempt to extract the payload, the payload containing archived test assets as described above in connection with FIG. 1. For example, the payload may be a compressed archive containing the testing application, information for formatting requests to the system under test, customer information, product information and any other information suitable for testing externally facing computer systems of the service provider.

Once the external hosts 306 has attempted to extract the payload, the external hosts 306 may transmit the result of the extraction to the database, the result may indicate whether the payload has been extracted 354 successfully. The coordinator 302 may, at some point in time after transmitting the command to extract the payload 352, query the database 320 to determine if the payload was extracted 358 successfully. If any of the external hosts 306 have failed to extract the payload successfully, the coordinator may cause the external hosts 306 to retry 356 extracting the payload. The coordinator 302 may cause the failed external hosts 306 to retry extracting the payload by re-transmitting the command to extract the payload to the failed external hosts 306. In various embodiments, the failed external hosts 306 may retry any particular failed step of the deployment process without a retry command from the coordinator.

If all of the external hosts 306 have extracted the payload successfully and/or if the coordinator has determined to proceed 360 with the deployment process, the coordinator 302 may then transmit a command to the external hosts 306 to generate load 362. The external hosts 306 may generate load by performing a variety of tests. For example, a particular test may have a corresponding test script, the test script when executed by the external hosts may cause the external hosts to perform a variety of different interactions with the system under test. The script may include logging on to the system under test, navigating to a particular product webpage operated by the system under test, placing the item in an electronic shopping cart, purchasing the product, transmitting data to the system under test or other similar actions exposed to users of the service provider. The external hosts 306 may be configured to execute multiple tests and to execute multiple tests simultaneously. Furthermore, the external hosts 306 may all receive the same payload and execute different tests based at least in part on the same payload. For example, a subset of the external host 306 may execute a load test configured to simulate maximum peak traffic and a second subset of the external hosts 306 may execute a purchase test configured to simulate customer purchasing items offered for sale on the service provider's website. In various embodiments, the deployment process may execute in parallel on the external hosts 306, such that the external hosts 306 may be in different states. The external hosts 306 may execute different deployment operation in parallel. For example, a first external host may be executing a download command while a second external host may be executing an extract payload command. Once a sufficient number of external hosts have completed deployment, the various tests of the system under test may be executed.

Figure 4:
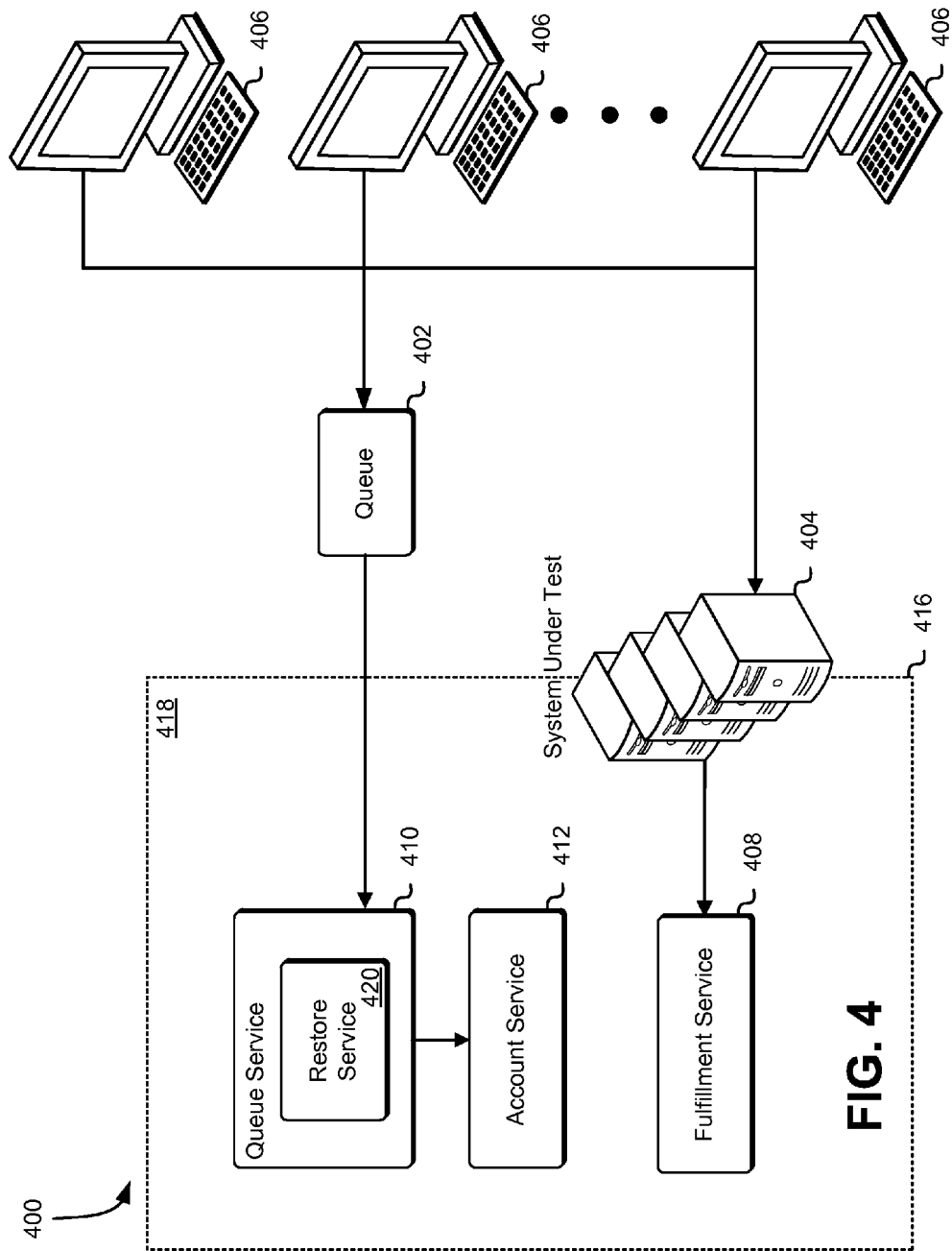
FIG. 4 shows an example of accessing resources from outside a VPN boundary in accordance with at least one embodiment.

FIG. 4 illustrates an example environment 400 where one or more computer systems running within a service provider environment, as well as the associated code running thereon, may restore state information that may have been altered during the execution of one or more tests on the computer systems of the service provider. A service provider 418 may operate a queue 402, the queue 402 may be configured to receive messages from one or more external hosts 406. The message may indicate operations performed by the external hosts 406 during the execution of one or more load tests on the system under test 404. The load tests may be executed as a result of a command from a coordinator as described above in connection with FIG. 1. Various deployment and testing processes may be used in accordance with the present disclosure along with or instead of the deployment process described above in connection with FIGS. 3A-3B.

During execution of various tests, the external hosts 406 may perform a variety of actions that alter or otherwise change state information maintained by the service provider. For example, the external hosts may execute a variety of purchase tests where the external hosts purchases an item offered for consumption on a website operated by the service provider. In response to the purchase, one or more systems of the service provider operating within the VPN boundary 416 may perform various actions, such as changing inventory information associated with the purchase, charging a customer account associated with the purchase, debiting a gift card or electronic wallet associated with the purchase, adding items to a library associated with the purchase, preparing to ship an item associated with the purchase and any other action associated with a purchase. The message enqueued by the external hosts 406 in the queue 402 may indicate which state information and/or action may have been performed by computer systems of the service provider in response to the test.

The external host 406 may transmit these messages contemporaneously or near contemporaneously with the execution of the test. For example, the external hosts 406 may execute a test and, as a result of the test, recommendation data may be generated based at least in part on the execution of the test. After completion of the test, the external hosts 406 may enqueue a message in the queue 402 indicating the test that the particular test executed and the resulting state change (e.g., the generated recommendation data). In another example, the external hosts 406 may, during execution of one or more tests, purchase a plurality of mobile application through the system under test 404. A fulfillment service 408 may receive purchase requests and add the mobile application to a library of mobile applications associated with a customer account. The external hosts 406 may then enqueue one or more messages in the queue 402 indicating the mobile applications purchased and the associated customer accounts to enable the restore service 420 to remove the purchases from the associated customer accounts.

The queue 402 may be a collection of computing resources collectively configured to receive queue messages and allow other computer systems or services to obtained enqueued messages. For example, the queue 402 may be a message queue instantiated by a queue service 410, the queue 402 further configured to receive messages over a public network and allow the queue service 410 to listen for enqueued messages from a private network. The queue service 410 may be a collection of computing resources collectively configured to listen for enqueued messages and obtain the messages so that the messages can be processed by one or more computer systems of the service provider. For example, the queue service 410 after instantiating the queue 402 may listen or otherwise receive data from the queue 402 indicating that one or more messages from the external hosts 406 have been received and enable the restore service 420 to process the message. Although the restore service 420 is illustrated in FIG. 4 as part of the queue service 410, the restore service 420 may be separate from the queue service 410 in accordance with the present disclosure.

The restore service 420 may be a collection of computing resources collectively configured to receive queue messages and restore and/or cleanup altered state information indicated in the message. For example, the restore service 420 may be a computer system inside the VPN boundary 416 configured to receive queue messages and transmit service calls to various other services of the service provider to restore the state information to account for changes that may have occurred as a result of the tests executed by the external hosts 406. The restore service 420 may receive a queue message from the queue service 410, the queue message may include information corresponding to a state change resulting from the execution of a test and the restore service 420 may transmit the information corresponding to the state change to an account service 412. The account service 412 may then cause the state to be restored based at least in part on the information corresponding to the state change. For example, the enqueue message may contain a purchase identification number which is obtained by the restore service 420 and included in a service call to the account service 412. The account service 412 may cause state information corresponding to the purchase identification number to be deleted or otherwise restore the state information to a previous state prior to the purchase being made.

The account service 412 may be a collection of computing resources collectively configured to receive information corresponding to a customer account and perform a variety of actions including adding, deleting or restoring information. For example, the account service 412 may be a computer system inside the VPN boundary responsible for managing customer account information. The restore service 420 may interact with multiple computer systems or services of the service provider in order to restore any state information that may have been changed during the execution of the tests by the external hosts 406. For example, the service provider may operate an inventory service responsible for managing inventory information associated with items offered for sale by the service provider. As a result of a particular test executed by the external hosts 406, the inventory service may change the inventory information associated with the items offered for sale. The restore service 420 may then transmit, based at least in part on a queue message indicating the inventory that has been altered by the test, a service call to the inventory service to restore the inventory information indicated in the queue message.

Figure 5:
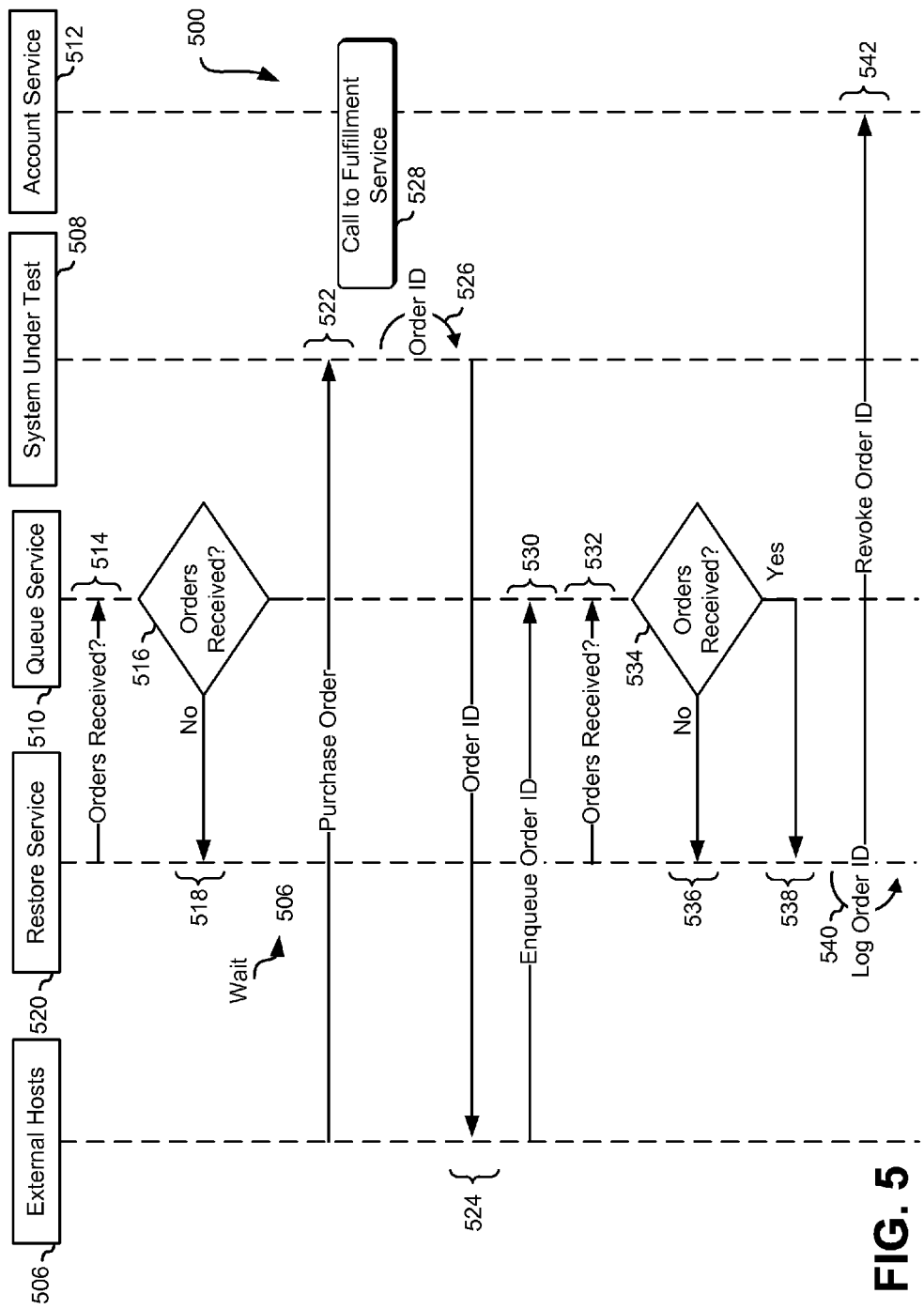
FIG. 5 shows an example message diagram for a method for accessing a resource from outside a VPN boundary in accordance with at least one embodiment.

FIG. 5 shows an example of a messaging diagram for accessing private resources from outside a VPN boundary. In FIG. 5 a number of different components executing the process are shown including external hosts 506, a restore service 520, a queue service 510, a system under test 508 and an account service 512. The external hosts 506 may include one or more computer systems as described above in connection with FIG. 1. For example, the external hosts may be configured to generate load on the system under test 508. The restore service 520 may be configured to receive queue messages from the queue service 510 and cause state information to be restored in multiple services of the service provider as described above in connection with FIG. 4. The queue service 510 may be responsible for generating one or more queues configured to receive queue messages from the external hosts 506 as described above in connection with FIG. 4. The account service 512 may be responsible for maintaining state information corresponding to customers of the service provider.

As show in FIG. 5, the restore service 520 may query the queue service 510 in order to determine if one or more orders have been received 514. The example illustrated in FIG. 5 shows purchase orders as the state information that may be altered as a result of the one or more tests, however any state information track by the service provider may be monitored and restored in accordance with the present disclosure. During the execution of the one or more tests on the system under test 508 it may take some time before state information is altered by the external hosts 506 executing the one or more tests. Furthermore, it may take time once the tests are executed for the external hosts 506 to enqueue messages corresponding to the state information and for the queue service 510 to obtain the messages from the queue. The queue service 510 may then respond with an indication that no orders have been received 518. The restore service may then wait 506 an amount of time before transmitting another query to determine if any purchase orders have been received.

During the executing of a buy test or other similar test the external hosts may generate a purchase order 522 through the system under test 508. The system under test 508 may then call a fulfillment service 528 in order to fulfill the purchase order submitted by the external hosts 506. For example, the external hosts 506 may submit purchase orders for a movie to the system under test 508, the system under test 508 may then call a fulfillment service 520 in order to add the movie to one or more customer libraries associated with purchase orders. The fulfillment service may return an order ID 526 associated with the purchase order. The order ID may include any identification information configured to identify a particular purchase order submitted. The system under test may then return the order ID to the external host 524. The system under test 508 may return the order ID to the external host 506 as part of the confirmation message indicating that the purchase order was processed successfully. In various embodiments, the system under test 508 does not return the order ID to the external hosts 506 and enqueue the order ID directly with the queue associated with the queue service 510.

Once the external hosts 506 have received the order IDs associated with the purchase order submitted, the external hosts 506 may then enqueue the order IDs 530 with the queue in order to enable the restore service to receive the order IDs and cause the system under test 508 to have state information restored based at least in part on the queue messages. The restore service 520 may then request queue messages indicating that one or more purchase orders have been received 532 from the queue service 510. The queue service 510 may obtain the queue message from the queue prior to the request or may obtain the queue message as a result of receiving the request. If no 536 queue messages are obtained by the queue service 510, the restore service may again wait for an order to be received and transmit an additional request to the queue service 510 at some point in time later. If messages have been enqueued by the external hosts 506, the queue service 510 may transmit information corresponding to the messages to the restore service 520 or the queue service 510 may transmit the messages directly to the restore service 520.

The restore service 520 may then log the order ID 540 and may then transmit a revoke order ID 542 request to the account service 512. The account service 512 may then revoke the purchase based at least in part on the order ID. Revocation of the purchase may restore the state information maintained by the account service 512 or another service of the service provider to a previous state prior to the execution of the tests by the external hosts 506. For example, the purchase order may add a movie to a customer library associated with a customer account. Revocation of the purchase may remove the movie from the customer library and allow the test to be executed again.

Figure 6:
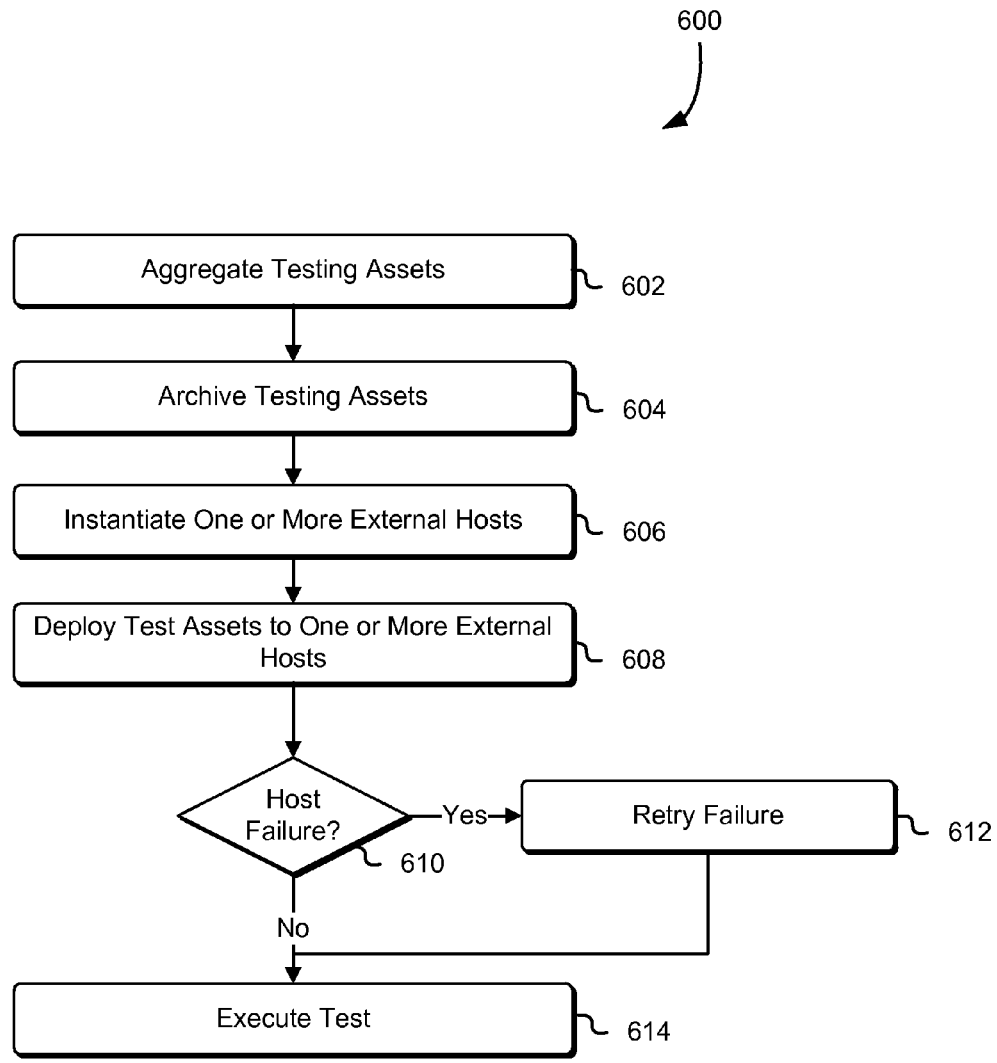
FIG. 6 shows an illustrative example of a process for deploying a persistent, state-tracked testing environment across a VPN boundary in accordance with at least one embodiment.

FIG. 6 shows an illustrative example of process 600 which may be used to deploy testing resources across a VPN boundary. The process 600 may be performed by any suitable system such as the coordinator and virtual machine service described above in connection with FIG. 2. Returning to FIG. 6, in an embodiment, the process 600 includes aggregating test assets 602. The coordinator may aggregate test assets required to execute one or more load tests from a public network on externally facing computer systems of the service provider. The coordinator may aggregate assets from a plurality of computer systems of the service provider. The test assets may include application data, customer data, product data and any other data suitable for generating load on a system under test.

The coordinator may then archive the test assets 604. Archiving the test assets 604 may include generating a tar file of the test assets or other compression technique suitable for aggregating the test assets into a single file. Furthermore, the archived test assets may be stored in a temporary data store located on a public network such that the archived test assets are accessible from one or more external hosts. The coordinator may then cause one or more external hosts to be instantiated 606. The coordinator may transmit a request to a virtual machine service to instantiate a number of external hosts on behalf of the coordinator. The virtual machine service may transmit an indication once the one or more external hosts have been successfully instantiated. The coordinator may then deploy the test assets to the one or more external hosts 608. Deploying the test assets to the one or more external hosts may include a variety of steps as shown in FIGS. 3A-3B. For example, the coordinator may transmit various commands to the external hosts to download the test assets, validate the test assets and extract the test assets.

During deployment of the test assets the one or more external hosts may transmit state information corresponding to the deployment process to a database associated with the coordinator. The coordinator may query the database to determine external host failure 610. If any external hosts have failed 612 the deployment process the coordinator may perform a variety of mitigation actions. The coordinator may cause the failed external host to restart the deployment process until the deployment process has completed successfully. The coordinator may also terminate the failed external host and continue with the testing. In various embodiments, the coordinator is configured to proceed with the testing when a quorum of external hosts have successfully completed the deployment process. The coordinator may then transmit commands to the external hosts to execute the test 614 on the system under test.

Figure 7:
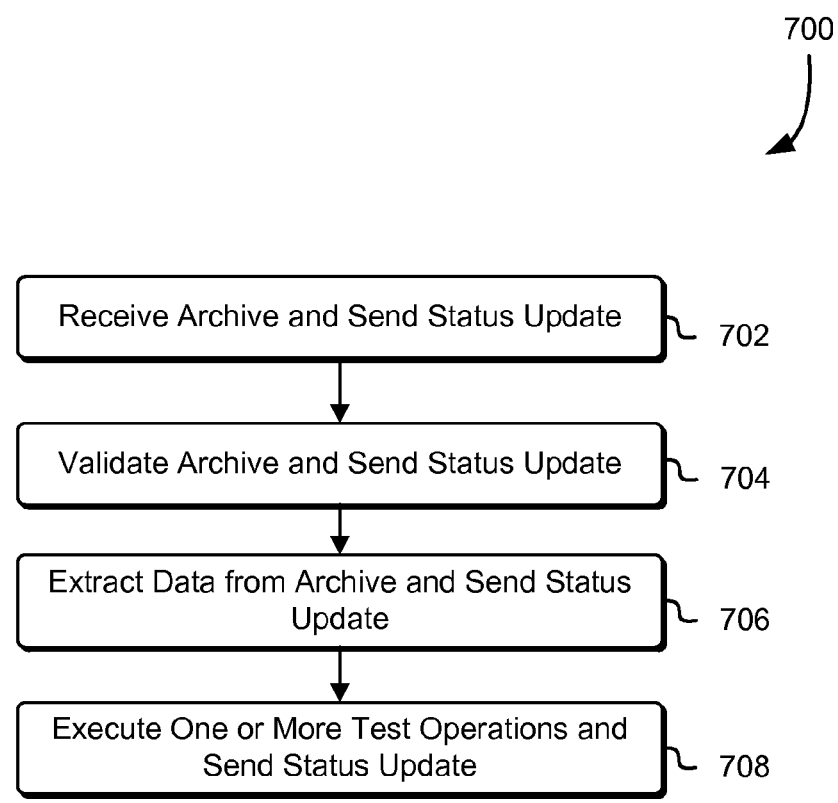
FIG. 7 shows an illustrative example of a process for executing a persistent, state-tracked testing environment across a VPN boundary in accordance with at least one embodiment.

FIG. 7 shows an illustrative example of the process 700 which may be used to deploy testing assets to one or more external hosts. The process 700 may be performed by any suitable system such as the external hosts described above in connection with FIG. 2. Returning to FIG. 7, in an embodiment, the process 700 includes receiving an archive of testing assets and sending a status update to a database 702. The external host may obtain an archive of testing assets (also referred to as a payload) from a storage system as described above in connection with FIG. 2. Furthermore, the external host may obtain the archive and send the status update based at least in part on a command from the coordinator responsible for managing the execution of the tests. The status update may indicate whether the archive was received successfully. Once the archive is received, the external host may validate the archive and send another status update 704. The archive may be validated based at least in part on a checksum received from the coordinator. The status update may be transmitted to a database associated with the coordinator and may indicate whether the checksum received from the coordinator and the checksum generated by the external host, based at least in part on the received archive, match.

The external hosts may then extract data from the validated archive and send a status update 706. The external host may extract data from the archive in order to execute a test application included in the archive and/or use data contained in the archive to execute the test. The extracted data may contain the test application that must be installed on the external hosts in order to perform the tests. Once the archived data is extracted the external host may be configured to execute the test. All external hosts may receive that same archive or different archives and all external hosts may execute the same or different tests. Furthermore, the external host may execute multiple tests based on a single archive file. The external host may then execute one or more test operations and then send a status update 708 to the database. The status update may include the results of the test and may also include any state information that may have been changed as a result of the test. The service provider may then restore any state information that may have been changed as a result of the test based at least in part on the status update.

Figure 8:
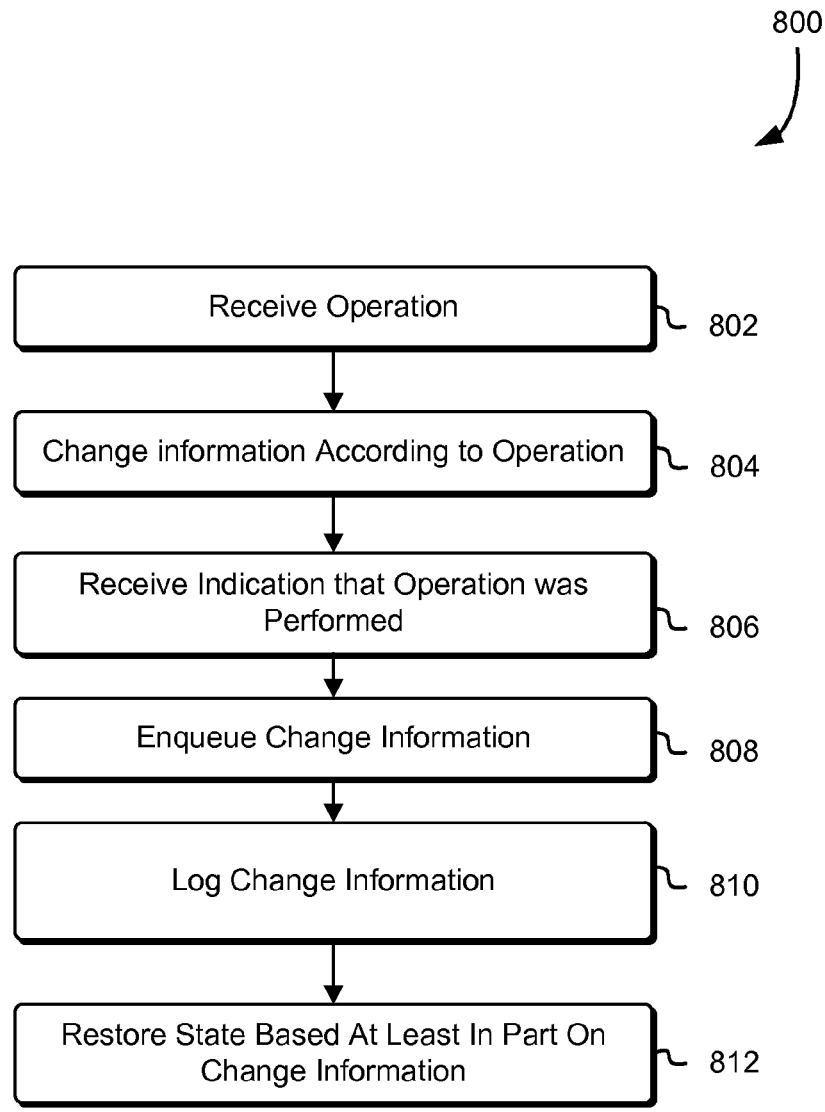
FIG. 8 shows an illustrative example of a process for accessing a resource from outside a VPN boundary in accordance with at least one embodiment.

FIG. 8 shows an illustrative example of the process 800 which may be to access resources inside a VPN boundary from a public network in order to perform cleanup resulting from one or more test operations. The process 800 may be performed by any suitable system such as the restore service and queue service described above in connection with FIG. 4. Returning to FIG. 8, in an embodiment, the process 800 includes receiving an operation 802. The operation may be any operation that causes the service provider to change or record information corresponding to the state of the system under test. The operation may occur as a result of a test of the system under test, where the test is executed from a public network. For example, the operation may be a purchase, a subscription, an addition to a digital library, a debit operation or other similar operation that causes the service provider to track information corresponding to the operation. The service provider may then change or record information based at least in part on the operation 804. For example, the fulfillment service, as described above in connection with FIG. 4, may receive a purchase order and change or record information based on the purchase order, such as inventory information corresponding to the purchase order. In another example, the fulfillment service may add information to a customer account indicating a subscription service to be added to the customer account.

The service provider may then transmit to the particular external host responsible for submitting the operation an indication that the operation was performed 806. Returning to the example above, the fulfillment service may indicate in response to the purchase order that the purchase order was processed successfully. The particular external host may then enqueue the change information 808 or information corresponding to the operation. The external host may enqueue the operation in a queue as described above in connection with FIG. 4. Once the operation has been enqueued a queue service may obtain the operation or information corresponding to the operation and forward the operation to a restore service. The restore service may then log the change information 810, the change information may correspond to the change recorded by the system under tests. For example, the change information may include information corresponding to an item purchase in response to a purchase test and the information recorded by the system under test in response to fulfilling the purchase. The restore service may maintain a log of the operations in order to track any information altered by the execution of the tests and ensure that the information has been restored or otherwise cleaned up. The log of the operations may also be used to generate metrics data. The restore service or some other service of the service provider may then restore or delete the information of the system under test based at least in part on the change information 812. For example, the restore service may transmit information corresponding to the operation to an account service, the account service may then delete any state information recorded as a result of the one or more tests executed by the particular external host.

Figure 9:
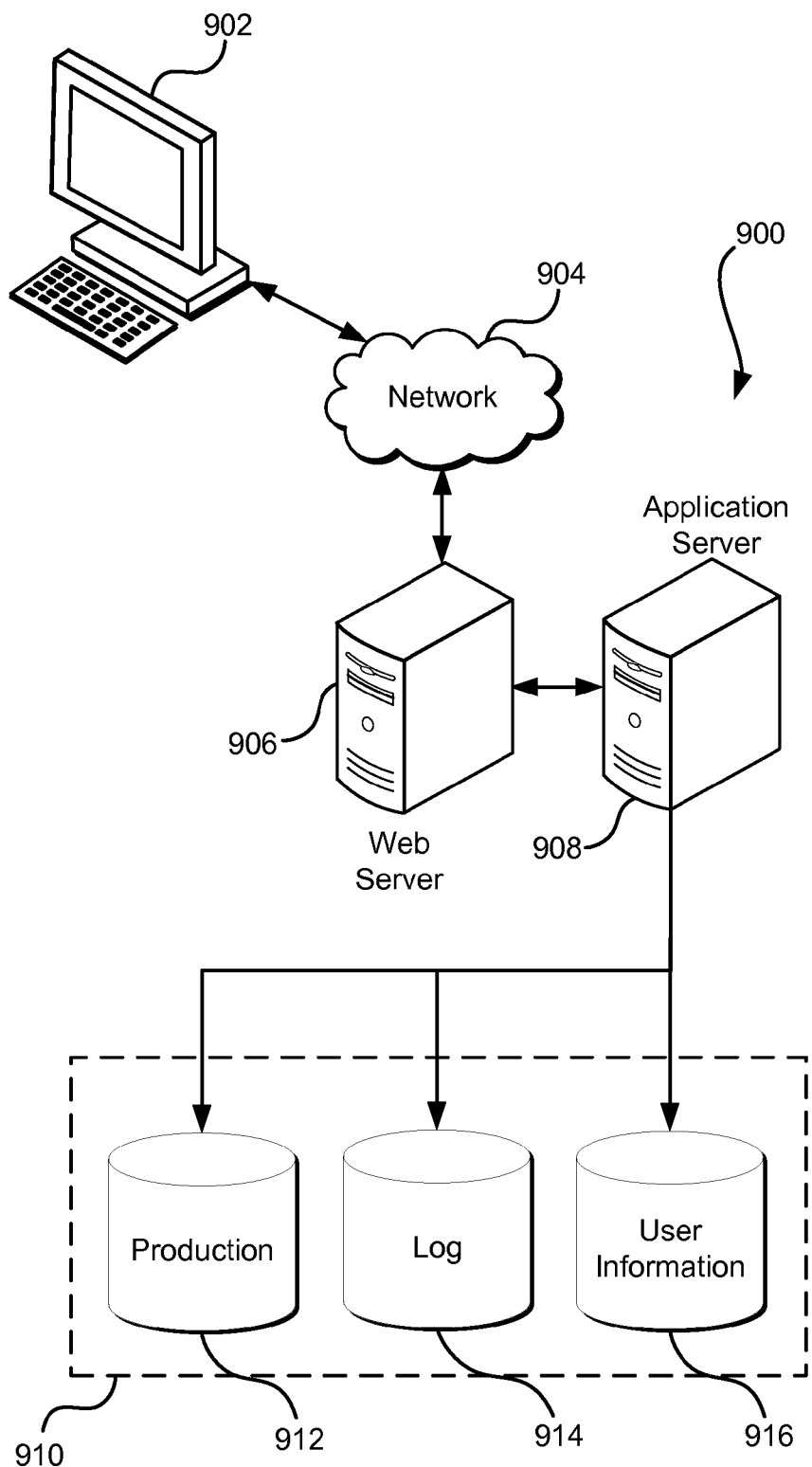
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for reserving changes to a system under test, comprising:
    under the control of one or more computer systems configured with executable instructions,
        transmitting a set of commands that cause one or more external hosts to interact, based at least in part on test accounts, with the system under test, the interactions causing one or more changes to be made to the system under test;
        recording the one or more changes to the system under test resulting from the interactions in a queue, the queue configured to receive one or more messages, indicating the one or more changes corresponding to the interactions, from the one or more external hosts over a public network; and
        processing the queue to reverse at least some of the one or more changes made to the system under test by at least, for each message of at least a subset of the messages:
            obtaining, from the queue, the message of the one or more messages;
            determining a subset of the one or more changes indicated by the message; and
            restoring the system under test such that the subset of the one or more changes are reversed.

2. The computer-implemented method of claim 1, wherein recording the one or more changes to the system under test further includes receiving information corresponding to the one or more changes from the one or more external hosts during execution of a test responsible for generating load on the system under test, the test configured to cause the interactions by the one or more external hosts on the system under test.

3. The computer-implemented method of claim 1, wherein processing the queue to reverse the one or more changes further includes receiving at queue service a message of the one or more messages from the queue and determining, based at least in part on the message, a service capable of reversing the subset of the one or more changes indicated in the message.

4. The computer-implemented method of claim 1, wherein the one or more changes includes changes to information associated with the test accounts.

5. A system, comprising:
    one or more processors;
    memory with instructions that, when executed by the one or more processors cause the system to:
    receive, at a system under test, test data including one or more customer accounts from one or more external hosts;
    execute one or more changes to the system under test based at least in part on the received test data;

obtain one or more messages corresponding to the one or more changes to the system under test, the one or more messages including information capable of identifying the one or more changes; and process the one or more messages by at least reversing the one or more changes identified by the one or more messages.

6. The system of claim 5, wherein the instructions that cause the system to execute one or more changes to the system under test further include adding information to a customer library associated with the one or more customer accounts.

7. The system of claim 5, wherein the instructions that cause the system to receive the test data further include receiving the test data from the one or more external hosts connected to a public network.

8. The system of claim 5, wherein the memory further includes instructions that when executed by the one or more processors cause the system to configure the one or more external hosts to transmit the one or more messages to the system.

9. The system of claim 5, wherein the memory further includes instructions that when executed by the one or more processors cause the system to determine, based at least in part on information contained in a particular message on the one or more messages, identification information for a particular change of one or more changes corresponding to the particular message.

10. The system of claim 5, wherein the memory further includes instructions that when executed by the one or more processors cause the system to log the one or more changes based at least in part on the one or more messages before reversing the one or more changes.

11. The system of claim 5, wherein the instructions that cause the system to obtain the one or more messages further includes obtaining the one or more messages from a queue, the queue configured to receive the one or more messages the one or more external hosts.

12. The system of claim 11, wherein the memory further includes instructions that when executed by the one or more processors cause the system to transmit a query to the queue in order to determine if at least one new message has been received.

13. A non-transitory computer-readable storage medium having collectively stored thereon executable instructions that, when executed by one or more processors of a computer system, cause the computer system to at least:

receive test information at a system under test, the test information using one or more fictitious accounts and causing effects to occur to the system under test while the system under test is concurrently used to provide one or more services for one or more non-fictitious accounts;

record effects occurring to the system under test resulting from the test information causing the effects to occur; and process the recorded effects to reverse the effects to the system under test.

14. The non-transitory computer-readable storage medium of claim 13, wherein the instructions further comprise instructions that, when executed by the one or more processors, cause the computer system to stream, by the system under test, effects occurring to the system under test.

15. The non-transitory computer-readable storage medium of claim 13, wherein the instructions that cause the computer system to receive test information at a system under test further include instructions that cause the computer system to receive test information from one or more external hosts connected to a public network.

16. The non-transitory computer-readable storage medium of claim 13, wherein the instructions that cause the computer system to process the recorded effects to reverse the effects to the system under test further include instructions that cause the computer system to receive at a queue service, operating within an isolated network, one or more messages corresponding to effects occurring to the system under test, the one or more messages indicating a service capable of reversing effects occurring to the system under test.

17. The non-transitory computer-readable storage medium of claim 13, wherein the instructions that cause the computer system to process the recorded effects to reverse the effects to the system under test further include instructions that cause the computer system to add credit back to a gift card.

18. The non-transitory computer-readable storage medium of claim 13, wherein the instructions that cause the computer system to process the recorded effects to reverse the effects to the system under test further include instructions that cause the computer system to reverse recommendation information generated based at least in part on the received test information to a state prior to receiving test information.

19. The non-transitory computer-readable storage medium of claim 13, wherein the instructions that cause the computer system to process the recorded effects to reverse the effects to the system under test further include instructions that cause the computer system to remove a credit to a third party.

20. The non-transitory computer-readable storage medium of claim 13, wherein the instructions that cause the computer system to record effects occurring to the system under test resulting from test information further include instructions that cause the computer system to receive effects occurring to the system under test from one or more external hosts.

* * * * *